United States Patent
Calabrese et al.

[11] Patent Number: 6,036,145
[45] Date of Patent: Mar. 14, 2000

[54] INTEGRATED SYSTEM FOR PROTECTING AND FASTENING PIPES TO A SUPPORTING STRUCTURE, PARTICULARLY OF A VEHICLE

[75] Inventors: Rocco Calabrese; Pietro Cau, both of Turin, Italy

[73] Assignee: I.T.W. Fastex Italia S.p.A, Turin, Italy

[21] Appl. No.: 09/035,926

[22] Filed: Mar. 6, 1998

[30] Foreign Application Priority Data

Mar. 7, 1997 [IT] Italy ................... TO97A0190

[51] Int. Cl.[7] .................. F16L 3/22; F16L 3/00
[52] U.S. Cl. .......................... 248/68.1; 248/73
[58] Field of Search ................ 248/68.1, 71, 73

[56] References Cited

U.S. PATENT DOCUMENTS

| | | | |
|---|---|---|---|
| 4,669,156 | 6/1987 | Guido et al. | 24/336 |
| 4,881,705 | 11/1989 | Kraus | 248/74.2 |
| 5,002,243 | 3/1991 | Kraus et al. | 248/68.1 |
| 5,033,701 | 7/1991 | Kraus | 248/68.1 |
| 5,535,969 | 7/1996 | Duffy, Jr. | 248/68.1 |
| 5,613,655 | 3/1997 | Marion | 248/68.1 |

*Primary Examiner*—Derek J. Berger
*Assistant Examiner*—David Heisey
*Attorney, Agent, or Firm*—Lowe Hauptman Gopstein Gilman & Berner

[57] ABSTRACT

An integrated system for protecting and fastening pipes to a supporting structure, in particular to a vehicle body, by means of threaded pins welded to the vehicle body, the system including at least one supporting element defined by a one-piece body or clip in turn including a central portion with a through hole housing, in use, a sleeve which fastens on to a threaded pin, at least one seat for a pipe, and a flat circular supporting region surrounding the hole on the side eventually facing the vehicle body; and a protection element integrated with the clip and defined by a channel, which provides for protecting the pipes and is connected laterally to the clip by a thin flexible strip which flexes to enable the channel to be rotated 180° on to the clip; the clip and the channel are co-molded simultaneously from the same material, such as a copolymer propylene resin with an appropriate filler; and, at assembly, the clip, supporting the pipe, is first fitted to the vehicle body and retained temporarily to the pin by radial tabs inside the hole, and, once the channel is fitted on to the clip, the sleeve is inserted inside the hole and forced axially on to the pin to fasten the channel and the underlying clip by means of a flared head on the sleeve.

11 Claims, 1 Drawing Sheet

INTEGRATED SYSTEM FOR PROTECTING AND FASTENING PIPES TO A SUPPORTING STRUCTURE, PARTICULARLY OF A VEHICLE

BACKGROUND OF THE INVENTION

The present invention relates to an integrated system for protecting and fastening pipes to a supporting structure, particularly of a vehicle, and more specifically to a system for protecting and fastening pipes, such as fuel and/or brake oil feed pipes, to a marketed vehicle.

Brake oil feed pipes in currently unberbody vehicles are made mostly of metal, and the fuel feed pipe of plastic, except for that portion in the engine compartment which, is made of metal connected to the plastic portion to protect the pipe against engine heat, or accidental contact with the vehicle body in the event of violent impact.

One known element or bracket for fastening one or more pipes, e.g. fuel and/or brake oil pipes, to the frame or underbody of a vehicle comprises a rigid-plastic structure having a supporting surface which rests on the frame, and includes half-open substantially cylindrical pipe seats defined partly by the structure itself and partly by a curved elastic wall which flexes to permit insertion of the pipe. Fastening means are provided at the supporting surface facing the vehicle which fit onto an electrowelded fastening pin projecting downwards from the frame or underbody.

Fuel and/or brake oil pipes fitted to a vehicle frame or underbody using the above known fastening element are obviously subject to damage in the event of an accident, or from engine heat either in the engine compartment or from the exhaust pipe which is also suspended to the underbody. On the other hand, protecting the pipes by means of independent protection elements fitted separately from the brackets to the vehicle body involves a considerable increase in cost, especially as regards assembly.

SUMMARY OF THE INVENTION

It is an object of the present invention to provide an integrated system for protecting and fastening pipes to a supporting structure, particularly of a vehicle, designed to overcome the aforementioned drawbacks of known fastening elements.

More specifically, it is an object of the present invention to provide a system for fastening brake oil and/or fuel pipes to the underbody of a vehicle, which is quick and easy to assemble, provides for safely supporting the pipes while at the same time ensuring effective protection of the pipes against impact and/or the heat generated by the engine or exhaust pipe, and which may be produced cheaply with a minimum number of operations.

According to the present invention, there is provided an integrated system for protecting and fastening pipes to a supporting structure, comprising at least one supporting element defined by a body comprising a central portion with a through hole, for housing, in use, a fastening member, at least one seat for a pipe, and a supporting region surrounding said hole on the side eventually facing said supporting structure; characterized in that said system also comprises an integrated protection element for protecting said pipes, which is in the form of a channel and joined to said body of said at least one supporting element by flexible connecting means; said supporting element and said protection element being co-molded simultaneously from the same plastic material, possibly mixed with an inert filler.

The protection channel may therefore be assembled simultaneously with the pipe supporting elements, and may be secured to the vehicle body together with the supporting elements using the same fastening members.

DETAILED DESCRIPTION OF THE INVENTION

Figure 1:
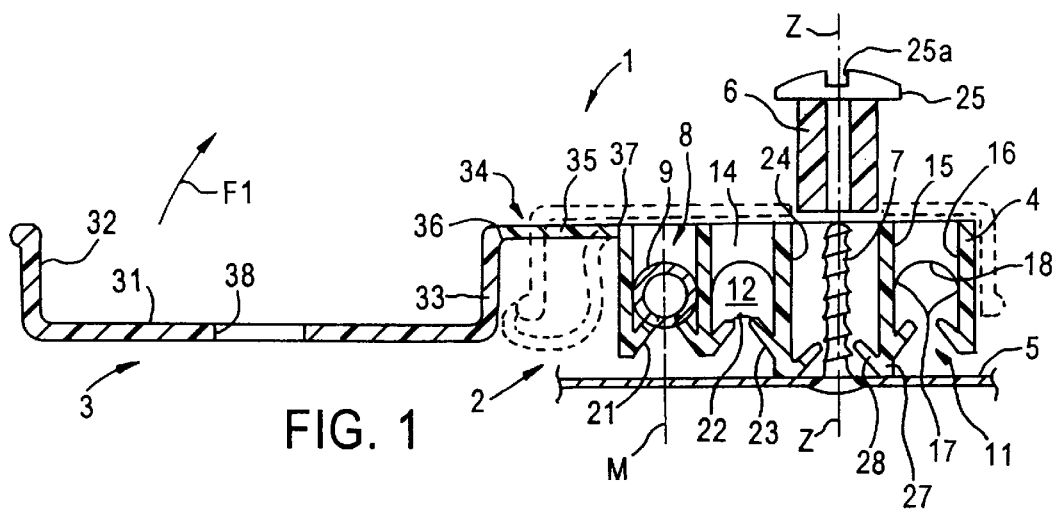
FIG. 1 is a transverse cross section of the fastening and protection system according to the present invention.
Figure 2:
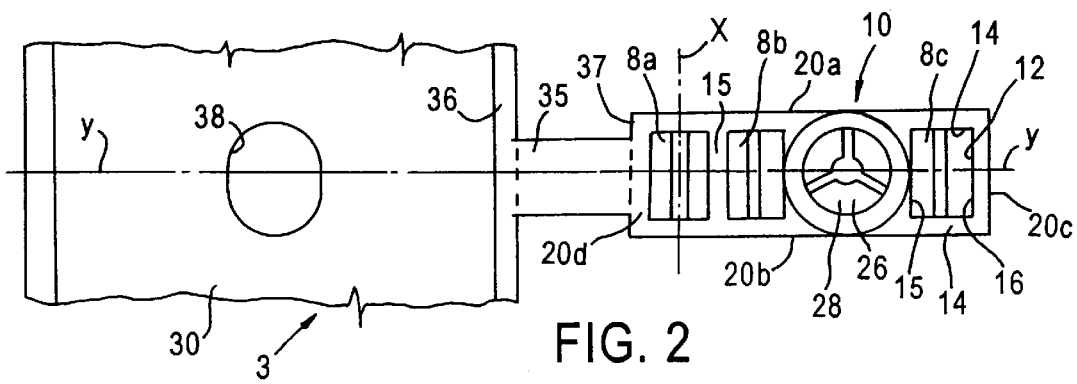
FIG. 2 is a top plan view of the FIG. 1 fastening and protection system.

With reference to FIGS. 1 and 2, the integrated pipe fastening and protection system 1 according to the invention, comprises at least one substantially known supporting element 2 and a protection element 3 integrally joined to supporting element 2. Supporting element 2 is defined by a single one-piece body 4—hereinafter referred to simply as a clip 4—which, in use, is fitted to a supporting structure—in the example shown, a known vehicle body (or underbody) 5—by known connecting members such as threaded pins 7 (known as TUCKERS®), electrowelded to underbody 5.

In the example shown, each clip 4 is fitted, as described below, to a corresponding pin 7 by means of a respective fastening member defined by a sleeve 6 insertable through a through hole 24 in clip 4. Sleeve 6 is formed internally in a known manner so as to be forced axially onto corresponding pin 7 projecting outwards from underbody 5, and to snap on to the pin with no possibility of withdrawal other than by being unscrewed.

Each clip 4 comprises at least one seat 8 for a pipe 9, and, in the preferred embodiment shown, comprises three seats 8a, 8b, 8c for housing respective pipes 9.

Seats 8 are located asymmetrically on opposite sides of a central portion 10 (FIG. 2) of clip 4. Each seat 8 comprises a mouth 11 permitting insertion of a pipe 9. Each seat 8 also comprises a through cavity 12 defined, opposite mouth 11, by a pair of separate substantially semicylindrical saddles 14 aligned along an axis X, coincident with the axis of the assembled pipe 9, for supporting pipe 9 by surrounding it by roughly 180°.

Cavity 12 is defined laterally by two facing parallel walls 15, only part of the height of which is joined to saddles 14, while the remaining projecting portions of walls 15 are free to flex to permit insertion of pipe 9. More specifically, the semicylindrical portions 18 of saddles 14 are connected at points 17 to the inner surfaces of walls 15. Saddles 14—defined by thin partitions aligned longitudinally and facing each other on opposite sides of clip 4—define the long longitudinal lateral walls 20a, 20b of clip 4, while the outermost lateral walls of the two end cavities 12 of clip 4 define the short or transverse end walls 20c, 20d of clip 4, which is therefore in the form of a parallelepiped block elongated along a longitudinal axis Y (FIG. 2) perpendicular to axis X.

At mouth 11, walls 15 comprise a pair of opposed elastic projections 21 sloping inwards of cavity 12 and symmetrical with respect to a mid plane M parallel to axis X. Each projection 21 terminates with an end 22 having an arc-shaped section to define a point contact region between the projection and the outer surface of pipe 9. Projections 21 are of such a length as to press with a small amount of interference against the inserted pipe 9, so that the pipe is maintained elastically stable, inserted in semicylindrical portion 18 of saddles 14, while at the same time substantially damping any vibration induced in the pipe by vehicle body 5.

The outer surfaces 23 of projections 21 define mouth 11, and the projections provide for assisting insertion of pipe 9, while at the same time preventing accidental withdrawal of the pipe from the respective seat.

Central portion 10 of clip 4 has through hole 24, which extends along an axis Z perpendicular to the X-Y plane (the plane containing both axes X and Y). As stated, hole 24 receives sleeve 6, which has a head 25 larger in diameter than hole 24, having a screwdriver slot 25a, and which, as will be seen, provides for locking both protection element 3 and supporting element 2 against the vehicle body or underbody 5 by axially forcing sleeve 6 onto threaded pin 7. On the side eventually facing vehicle body 5, hole 24 is surrounded by a flat circular supporting region 26 defined by a collar 27 projecting axially with respect to mouths 11 to keep pipes 9 detached from the vehicle body.

Collar 27 has a number of elastic tabs 28 sloping inwards of hole 24 and symmetrically with respect to the axis Z of hole 24. Tabs 28, which are sized to engage pin 7 inserted inside hole 24 and provide for temporarily retaining clip 4 when assembling system 1 to vehicle body 5, or when detaching protection element 3 from clip 4, as described in detail below.

According to the invention, to protect pipes 9 fitted as described above to vehicle body 5, provision is made for said protection element 3 integrated with supporting element 2 and defined by a thin-walled U-section channel 30 made of the same plastic material as clip 4 and extending perpendicular to longitudinal axis Y and parallel to axis X (perpendicularly the FIG. 1 plane).

Channel 30 is defined by a protection wall 31 joined along its entire length to two lateral walls 32 and 33 perpendicular to wall 31, and supports laterally in projecting manner one or more clips 4, to which it is joined by connecting means 34 defined, in the example shown and for each clip 4, by a flat flexible strip 35 parallel to the X-Y plane. At one end, strip 35 is integral with an edge 36 of one of the lateral walls of channel 30, e.g. wall 33, and at the other end is integral with an edge 37 of a transverse end wall 20d of clip 4, which edge 37 is perpendicular to axis Z of hole 24 and located on the opposite side to mouth 11.

System 1 is assembled for use as follows. Prior to use, fastening and protection system 1 according to the invention is configured as shown in FIGS. 1 and 2, wherein channel 30, strip 35 and clip 4 are substantially coplanar. Initially, pipes 9 are inserted, aside, into respective seats 8 of the various clips 4 required for assembly; clips 4 together with pipes 9 are fitted on to respective pins 7 projecting from vehicle body 5, by pushing the clips axially so that collar 27 of hole 24 rests against the vehicle body, and clips 4 are retained temporarily to pins 7 by tabs 28 of hole 24; each channel 30 is then rotated roughly 180° parallel to itself and in the direction of arrow F1 to flex strip 35, and is pressed on to respective clip/s 4, so that strip 35 assumes the shape of an S and is housed between lateral wall 33 of channel 30 and the end wall 20d of each clip 4; and, finally, sleeves 6 are inserted inside holes 24 through respective slotted holes 38 formed in protection wall 31 and equal in number to clips 4 connected to each channel 30, and are forced axially to snap on to threaded pins 7.

At the assembly stage, the flexibility of strips or wings 35 and the slotted shape of holes 38 enable channel 30 to be connected tightly to integral clip/s 4 by means of sleeves 6, even in the event of positioning errors (other than nominal center distances) of pins 7 within established tolerances.

To remove channel 30 from respective clip 4, respective sleeve/s 6 is/are unscrewed using a screwdriver in slot 25a in head 25 of sleeve 6 to release the channel, which may then be rotated in the opposite direction to that of assembly to expose a portion of pipes 9 for inspection. To remove the clips and respective pipes as well, e.g. when replacing the pipes, the clips and pipes must be released from pins 7.

Figure 3:
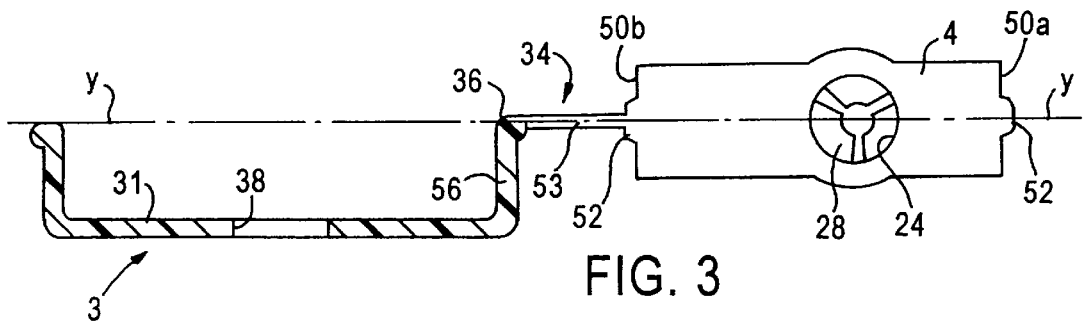
FIG. 3 is a simplified top plan view of a variation of the FIG. 1 system.
Figure 4:
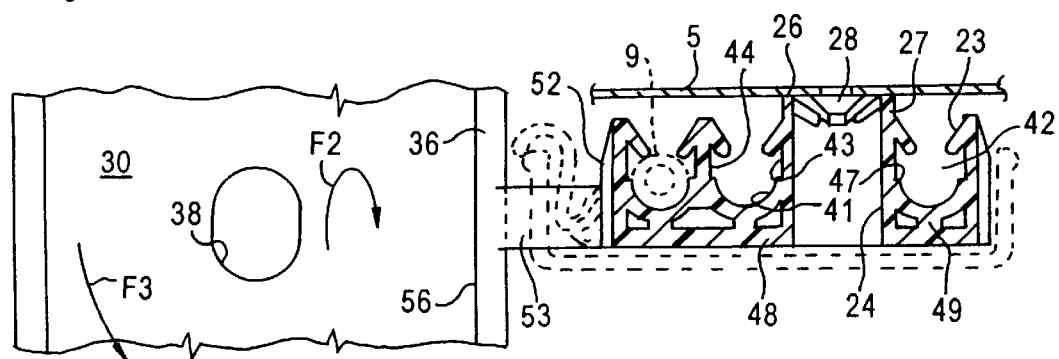
FIG. 4 is a transverse cross section of the FIG. 3 system.

FIGS. 3 and 4 show a variation of the FIG. 1 system, which differs in the following respects: on the opposite side to mouth 11, each seat for pipe 9 (FIG. 4) is closed by a continuous semicylindrical supporting base 41 parallel to transverse axis X and for receiving a pipe; each seat is defined by a cavity 42 in turn defined by two facing lateral walls 43 and 44 parallel to axis X and connected to semicylindrical base 41 by a step 47; cavities 42 are open on another two sides in the direction of axis X; semicylindrical bases 41 are connected to a bottom wall 48 by ribs 49 parallel to axis X; the outermost transverse walls 50a and 50b each have an outer rib 52 extending the full height of wall 50a, 50b and parallel to axis Z of hole 24; element 34 connecting channel 30 to clip 4 is defined, in this version, by a strip 53 connected to one of the two end ribs 52 and to edge 36 of channel 30, and perpendicular with respect to the position of strip 35 in the FIG. 1 version; channel 30 therefore extends perpendicular to the X-Y plane (FIG. 3); when assembling the FIG. 3 and 4 system to vehicle body 5, channel 30 must be rotated, by twisting strip 53, firstly by 90° with respect to clip 4 and about axis Y (arrow F2 in FIG. 4) to position channel 30 parallel to the X-Y plane, and secondly by 180° parallel to itself (arrow F3) to be fitted to clip 4; once channel 30 is fitted to clip 4, strip 53 is therefore twisted 90° and folded between a lateral wall 56 of channel 30 and the outer transverse wall 50b of clip 4, as shown by the dash line in FIG. 4.

In both the FIG. 1 and 4 versions, integrated supporting and protection elements 2 and 3 are formed simultaneously, in a single molding operation, from the same plastic material, such as a copolymer polypropylene resin with an appropriate inert filler, e.g. talc, for good heat resistance. Sleeves 6, on the other hand, may continue to be made from more traditional materials, such as polyamide or polyacetal resin, for ensuring firm retention to pins 7, as demanded by the application.

We claim:

1. An integrated system for protecting and fastening pipes (9) to a supporting structure (5), comprising a fastening member (6); at least one supporting element (2) defined by a body (4) having a mounting portion (10) formed with a through hole (24) for receiving, in use, said fastening member (6), said body (4) including at least one seat (8) adapted for receiving one said pipe (9), and a supporting region (26) surrounding said hole (24) on a side of the body (4) adapted to face said supporting structure (5); wherein said system (1) further comprises an integrated protection element (3) for protecting said pipes (9), said integrated protection element (3) being in the form of a channel (30) joined to said body (4) of said at least one supporting element (2) with a flexible connecting element (34, 35, 53); said supporting element (2) and said protection element (3) being co-molded simultaneously from the same plastic material, said channel and flexible connecting element being configured so that a mouth of said at least one seat directly faces and is open to the supporting structure (5) when said channel is pivoted into protective position covering said seat (8).

2. An integrated system as claimed in claim 1, wherein said integrated protection element (3) in the form of a channel (30) comprises a protective wall (31) and two longitudinal lateral walls (32, 33, 56) joined to and perpendicular to said protective wall (31); said channel (30) extending adjacent to said at least one supporting element (2) and perpendicularly to a longitudinal axis (Y) of said supporting element (2).

3. An integrated system as claimed in claim 1, wherein in that said channel (30) is fitted, after being rotated 180°, to said supporting element (2); said fastening member (6) simultaneously fastening said channel (30) and said body (4) to said supporting structure (5).

4. An integrated system as claimed in claim 3, wherein said fastening member is defined by a sleeve (6) which is formed independently of the channel (30) and comprises a flared head (25), said sleeve engages said hole (24) via a slotted hole (38) in said protective wall (31), so as to be forced-fitted and snapped onto a corresponding threaded pin (7) integral with the supporting structure (5) to fasten said channel (30) to said body (4) on the opposite side to said seats (8).

5. An integrated system as claimed in claim 4, wherein said hole (24) is surrounded, at one end (26) facing, in use, said supporting structure (5), by an axially-projecting flat supporting collar (27); said collar being provided internally with substantially radial tabs (28) cooperating with said threaded pin (7) to temporarily retain said body (4) integral with said supporting structure (5).

6. An integrated system as claimed in claim 1, wherein said connecting element (34, 35, 53) is defined by a flat flexible strip (35, 53), which is connected integrally in one piece, at one end, to an edge (36) of a lateral wall (33) of said channel (3), and, at the opposite end, to said body (4).

7. An integrated system as claimed in claim 6, wherein said strip (35) is joined in one piece to an edge (37) of said body (4), said edge is perpendicular to the axis (Z) of said hole (24) and located on the opposite side to a mouth (11) of the body (4).

8. An integrated system as claimed in claim 6, wherein said strip (53) is joined in one piece to an end wall (50b) of said body (4); and in that said strip (53) is oriented parallel to the axis (Z) of said hole (24).

9. An integrated system as claimed in claim 8, wherein said at least one seat (8) comprises a closed cavity (42) defined by a continuous substantially semicylindrical supporting base (41) aligned with an axis (X), located on the opposite side to a mouth (11) of said body (4), and for receiving a pipe (9).

10. An integrated system as claimed in claim 1, wherein said channel (30) and said supporting element (2) are made of a copolymer polypropylene resin with a talc filler, while said sleeve (6) is made of a polyacetal or polyamide resin.

11. An integrated system for protecting and fastening pipes (9) to a supporting structure (5), comprising a fastening member (6); at least one supporting element (2) defined by a body (4) having a mounting portion (10) formed with a through hole (24) for receiving, in use, said fastening member (6), said body (4) including at least one seat (8) adapted for receiving one said pipe (9), and a supporting region (26) surrounding said hole (24) on a side of the body (4) adapted to face said supporting structure (5); wherein said system (1) further comprises an integrated protection element (3) for protecting said pipes (9), said integrated protection element (3) being in the form of a channel (30) joined to said body (4) of said at least one supporting element (2) with a flexible connecting element (34, 35, 53); said supporting element (2) and said protection element (3) being co-molded simultaneously from the same plastic material, wherein said supporting region projects a distance from said body which is greater than a corresponding projecting distance of a mouth of said seat so that a distal end of said supporting region contacts the supporting structure and thereby spaces the mouth of said seat from said supporting structure.

* * * * *